United States Patent [19]
Bechte et al.

[11] Patent Number: 5,522,429
[45] Date of Patent: Jun. 4, 1996

[54] STROKE LIMITER FOR SINGLE-LEVER MIXING VALVE

[75] Inventors: Veit Bechte, Holzwickede; Günter Faust, Fröndenberg; Gunter Gäbel, Iserlohn; Heinz Hirsch, Soest, all of Germany

[73] Assignee: Friedrich Grohe Aktiengesellschaft, Hemer, Germany

[21] Appl. No.: 335,054

[22] Filed: Nov. 7, 1994

[30] Foreign Application Priority Data

Nov. 30, 1993 [DE] Germany ............... 43 40 712.9
Jun. 24, 1994 [DE] Germany ............... 44 22 125.8
Jun. 24, 1994 [DE] Germany ............... 44 22 126.6

[51] Int. Cl.⁶ ................................................. F16K 11/06
[52] U.S. Cl. ................. 137/625.17; 137/625.41; 251/288; 251/297
[58] Field of Search ................ 137/625.17, 625.41; 251/288, 297

[56] References Cited

U.S. PATENT DOCUMENTS

| | | | |
|---|---|---|---|
| 4,089,347 | 5/1978 | Christo | 137/625.41 |
| 4,505,301 | 3/1985 | Yang | 251/297 |
| 4,610,272 | 9/1986 | Gottwald et al. | 137/625.17 |
| 4,733,688 | 3/1988 | Lorch | 137/625.17 X |
| 4,941,509 | 7/1990 | Orlandi | 137/625.17 |
| 4,960,154 | 10/1990 | Dagiantis | 251/297 X |
| 4,971,113 | 11/1990 | Pawelzik et al. | 137/625.17 |

FOREIGN PATENT DOCUMENTS

| | | |
|---|---|---|
| 0309443 | 3/1989 | European Pat. Off. |
| 0568013 | 11/1993 | European Pat. Off. |
| 3632220 | 4/1987 | Germany |
| 3607349 | 9/1987 | Germany |
| 3719410 | 12/1988 | Germany |
| 3822217 | 1/1990 | Germany |
| WO94/19630 | 9/1994 | WIPO |

*Primary Examiner*—Stephen M. Hepperle
*Attorney, Agent, or Firm*—Herbert Dubno; Andrew Wilford

[57] ABSTRACT

A flow-control valve has a housing, a valve cartridge in the housing connectable between sources of hot and cold water and an output and including a valve for varying a volume/rate parameter and a temperature parameter of flow from the sources to the output, and a lever pivoted on the cartridge about two transverse axes, connected to the valve means, and movable by pivoting about one of the axes along a path in one direction relative to the housing to vary one of the parameters and movable by pivoting about the other of the axes in another direction relative to the housing to vary the other parameter. A stop is provided on the housing outside the valve cartridge along the path engageable with the lever. A biasing or spring unit urges the stop transversely into the path of the lever and thereby inhibits movement of the lever along the path past the stop.

20 Claims, 7 Drawing Sheets

STROKE LIMITER FOR SINGLE-LEVER MIXING VALVE

FIELD OF THE INVENTION

The present invention relates to a single-lever valve. More particularly this invention concerns a system for limiting the stroke of the lever of such a valve.

BACKGROUND OF THE INVENTION

A standard single-lever flow-control valve has a fixed valve plate formed with a pair of input ports respectively connected to hot- and cold-water input lines and, offset therefrom, an output port connected to an output line normally leading to a faucet. A movable valve plate sitting atop this fixed valve plate has a mixing cavity open toward the fixed plate and movable to variously overlap the ports. When the movable plate is pivoted about a normally upright axis perpendicular to the interface between the plates it can align more of one of the input ports with the mixing cavity and less of the other inlet port to vary the ratio of hot and cold water fed to the outlet port, and when slid in a front-to-back direction parallel to the plate interface it can control the overall extent of overlap to vary the overall flow from the inlet ports through the mixing cavity to the outlet port.

Typically the movable valve plate is pivoted on the bottom end of a lever that is centrally pivoted on a housing liner that is coupled to the movable plate to rotate it about the upright axis. The upper end of the lever is fitted to a handle that is raised and lowered to control volume rate of flow and that is pivoted from side to side to control output temperature.

As described in German patent documents 3,719,410 filed 11 Jun. 1987 by H. Buckel and 3,822,217 filed 1 Jul. 1988 by H. Oberdörfer, it is known to provide such a valve with a stop that limits movement of the lever along the path it travels to control flow rate. The purpose is to prevent the faucet from being turned on full, thereby wasting water. The stop is elastically deflectable so that the user can push the lever past it and thereby get full flow.

The problem with the known arrangements is that the stop system is provided in the valve cartridge immediately adjacent the lever pivot axis. Thus in order for the overridable stops to be effective they must bear with considerable force on the lever. As a result they are subjected to substantial friction and wear.

Another disadvantage of the known systems is that they must be built in at the factory. There is no chance for the installer to change or reset the stops.

OBJECTS OF THE INVENTION

It is therefore an object of the present invention to provide an improved single-lever flow.-control valve.

Another object is the provision of such an improved single-lever flow-control valve which overcomes the above-given disadvantages, that is which has overridable position-defining stops that have a long service life and that can be installed and/or altered in the field by the installer.

SUMMARY OF THE INVENTION

A flow-control valve has according to the invention a housing, a valve cartridge in the housing connectable between sources of hot and cold water and an output and including a valve for varying a volume/rate parameter and a temperature parameter of flow from the sources to the output, and a lever pivoted on the cartridge about two transverse axes, connected to the valve means, and movable by pivoting about one of the axes along a path in one direction relative to the housing to vary one of the parameters and movable by pivoting about the other of the axes in another direction relative to the housing to vary the other parameter. A stop is provided on the housing outside the valve cartridge along the path engageable with the lever. A biasing or spring unit urges the stop transversely into the path of the lever and thereby inhibits movement of the lever along the path past the stop.

Thus with this system the stop system is provided on the housing outside the cartridge. This has two main advantages. First it increases the distance from the lever pivot axis, so that the stop need not be pressed with great force against the lever to provide a detectable stop. Thus the arrangement can be substantially simpler and can be expected to have a much longer service life. In addition it is possible to install and/or modify the stop system in the field. The plumber can install the stops or change them easily, without even shutting off the water.

According to the invention the stop is laterally deflectable parallel to the one axis and is unitarily formed with the spring means. In addition the spring is an elastically deformable part of the housing formed with a bump engageable with the lever and forming the stop. Normally the housing is formed with two such elastically deformable parts and bumps flanking the path and engageable with the lever. As a rule the lever is formed with a bump engageable with the stop although it is also possible for the lever to be centrally formed with a notch into which the bump of the stop is engageable. It is also possible for the lever to be formed with a notch into which the bump of the stop is engageable.

In accordance with this invention the bump has a forwardly facing relatively steep flank and a rearwardly facing relatively shallow flank. The housing can include an abutment ring pivotally movable about the other axis with the lever and an abutment ring fixed on the housing and engageable with the movable abutment ring in angular end positions of the lever. The movable abutment ring is formed with a slot defining the path and traversed by the lever and with the housing part forming the bump.

In a particularly simple system the part is a web having both ends unitarily joined with the housing and centrally formed with the bump. It can also be a finger having one end joined unitarily with the housing and an opposite free end formed with the bump. In another arrangement the lever is provided with a tubular insert fitting snugly around the lever and formed with a bump engageable with the bump of the stop.

To make the stops into real end-position definers, a removable filler block is fitted between the bump and the housing to prevent lateral deflection of the bump and movement of the lever past the bump. It is also possible for the spring to include a separate biasing element braced between the part and the housing.

A removable insert forming the part and bump can fit in either of two positions in the housing. The bump is positioned to be in two different positions along the path depending on the position of the inert in the housing. Thus the system can be set in the field for the desired stroke.

According to the invention the bump and part are unitarily formed of a stiff but elastically deformable plastic. The lever has an upper end provided with a handle and an insulating sleeve is provided between the lever lapper end and the handle. The cartridge has an upstanding collar from which the lever extends and on which the part with the bump is mounted.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
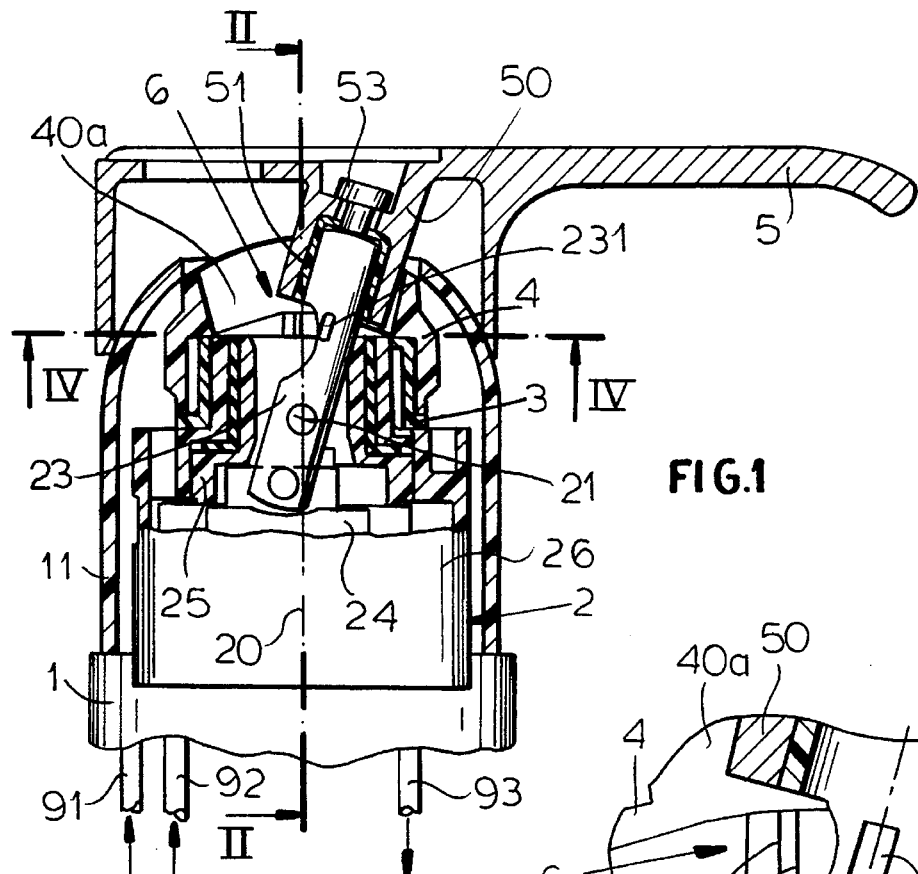
FIG. 1 is a side view in vertical section through a mixing valve according to the invention.
Figure 1A:
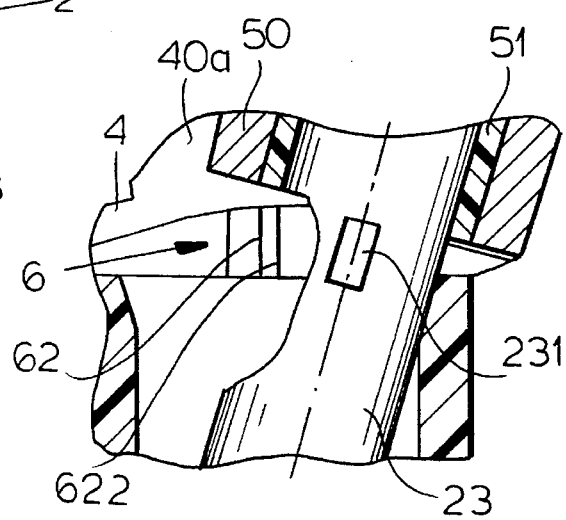
FIG. 1a is a large-scale view of a detail of FIG. 1.
Figure 2:
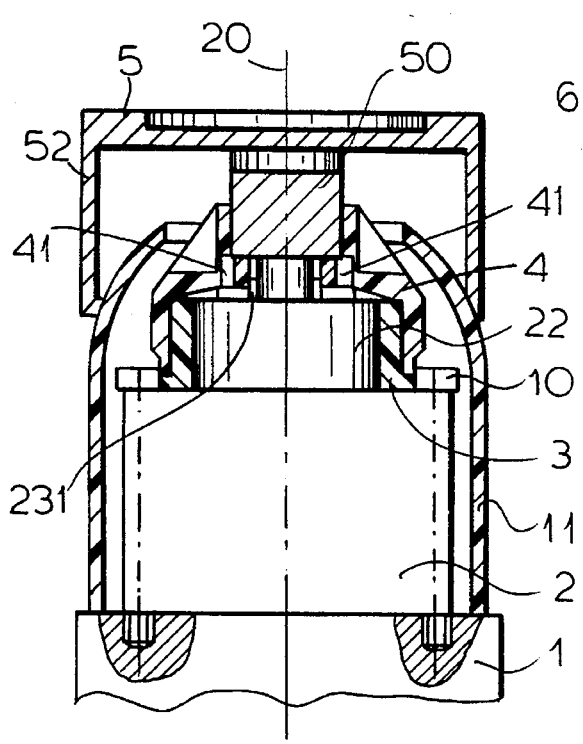
FIG. 2 is a section taken along line II—II of FIG. 1.

As seen in FIGS. 1 through 4 a single-control mixing valve has a housing 1 connected to hot- and cold-water input lines 91 and 92 and an outlet line 93 normally leading to a faucet. Inside the housing 1 is a valve cartridge 2 having a cylindrical casing or housing 26 centered on an upright axis 20 and secured in place by screws 10. This casing 26 holds an inner part 25 pivotal about the axis 20 and is formed centered on the axis 20 with an upstanding collar 22. A lever 23 is pivoted at an axle 21 perpendicular to the axis 20 in the inner part 25 and has a lower end pivoted on a valve element 24 inside the inner part 25. An upper end of the lever 23 is fitted with an insulating sleeve 51 and in turn is fitted into a complementary collar 50 formed on a handle 5. A screw 53 secures the handle 5 to the lever 23. The housing 1 is fitted with a cover 11 having a cylindrical lower part and an apertured part-spherical upper part to cover the valve mechanism.

As is standard, pushing the handle 5 to the side so it, the lever 23, the inner part 25, and the element 25 pivot about the axis 20 in the casing 26 changes the ratio of flow from the inlet lines 91 and 92 to the outlet line 93, thereby varying the output temperature. Tipping the handle 5 back and forth about the axis 21 along a path or stroke plane L changes the volume rate of flow from the lines 91 and 92 to the line 93.

The angular temperature-control movement of the handle is limited by means of an abutment ring 4 that is formed with an upwardly open slot 40 having a wide part 40a through which the lever 23 extends and in which the collar 50 fits. This ring 4 therefore rotates about the axis 20 with the handle 5. Its angular travel is restricted by means of a fixed abutment ring 3 that fits in any of a plurality of angularly offset positions on the extension 22 of the housing 26. Such a system is described in German patent document 3,607,349 filed 6 Mar. 1986 by M. Pawelzik.

Figure 3:
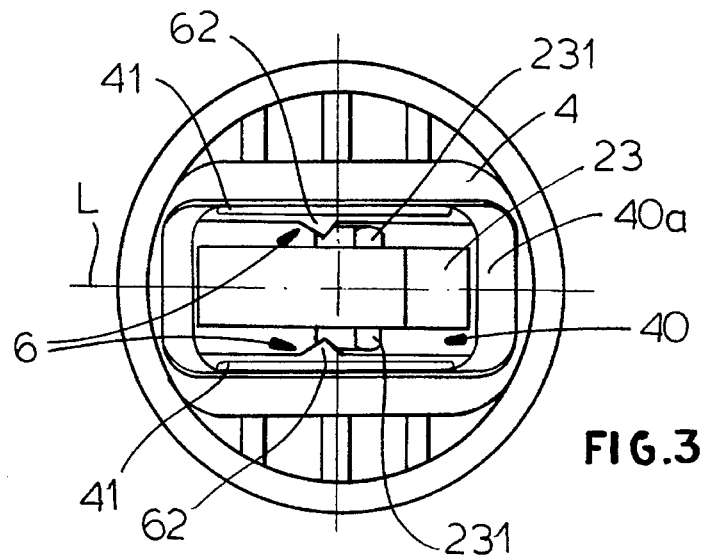
FIG. 3 is a top view of the valve with the handle removed.
Figure 5:
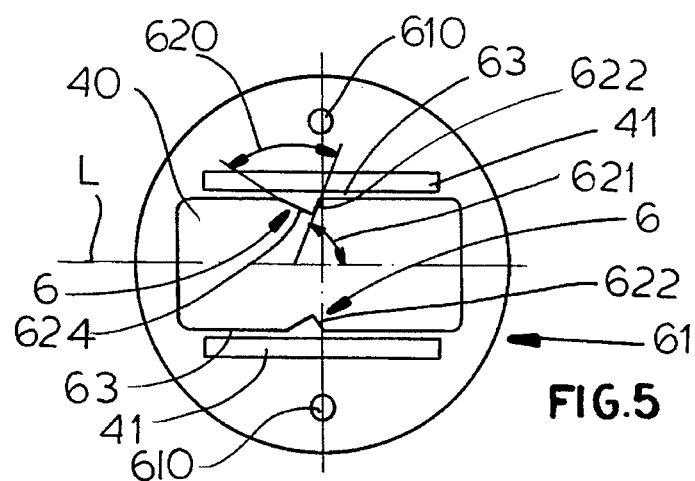
FIG. 5 is a top view of a stop plate usable in a single-lever valve.

According to the invention a system 6 of stops is provided to limit the angular stroke of the handle 5 about the axis 21, that is to set a certain maximum flow rate. This system 6 is set up so that the user can override it by giving the handle 5 an extra-hard push. As seen in FIG. 3 the ring 4 is formed with a pair of webs 63 extending parallel to the stroke plane L and each formed near the axis 20 with a stop constituted as a sawtooth bump 62. FIG. 5 shows how these webs can also be formed on a disk 61 formed with holes 610 through which the screws 10 can pass so it can be mounted underneath the ring 4.

The teeth 62 each have a steep forwardly directed flank 622 and a shallow backwardly directed flank 624. Behind each such web 63, which is unitarily formed with the ring 4 or with the disk 61 of a stiff but elastically deformable glass-fiber reinforced plastic, is a slot or open space 41 permitting the web 63 and the tooth 62 on it to be deflected laterally, back away from the plane L. The flanks 622 and 624 lie at an angle 620 of between 45° and 135°, here 90°, to each other. The front flank 622 forms an angle 621 with the stroke plane L of between 30° and 90°, here 60°. In addition the sides of the lever 23 are formed with ridges or bumps 231 which are engageable with the sawtooth bumps 62 in a central position, corresponding to medium flow out of the line 93. In this position the bumps 231 engage the front flanks 622. If more flow is needed, the user need merely push on the handle 5 enough to cam back the webs 63, allowing the bumps 231 to move back past the teeth 62. On reverse movement the bumps 231 engage the shallower rear flanks 624 of the teeth 62 and easily cam them out.

Figure 4:
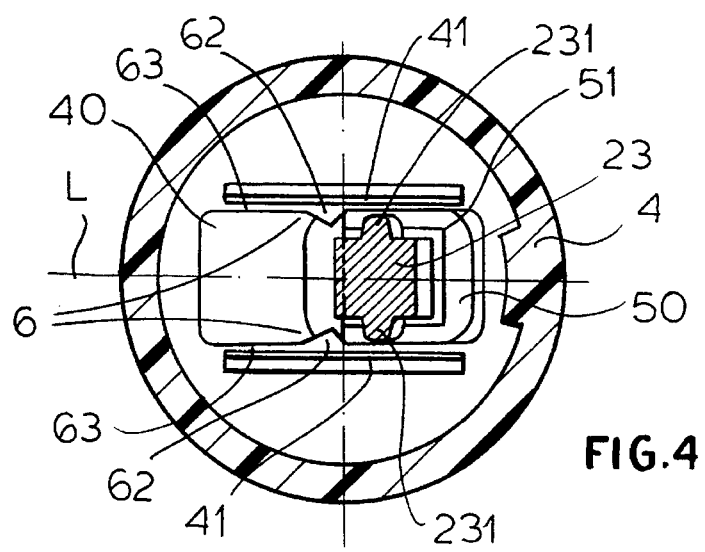
FIG. 4 is a cross section taken along line IV—IV of FIG. 1.
Figure 6:
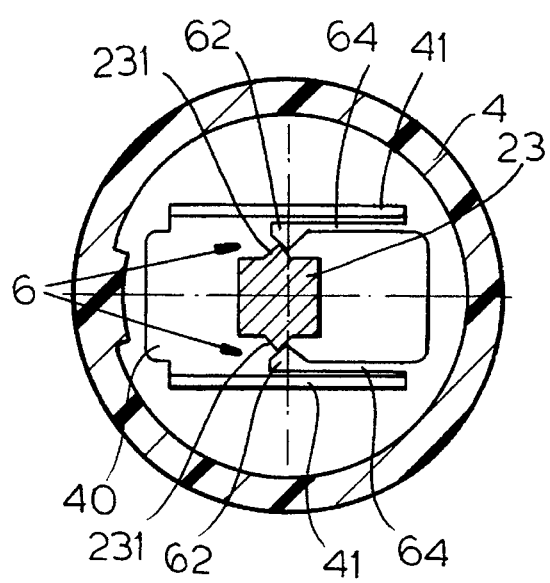
FIGS. 6 through 12 are views like FIG. 4 showing alternative systems according to this invention.
Figure 7:
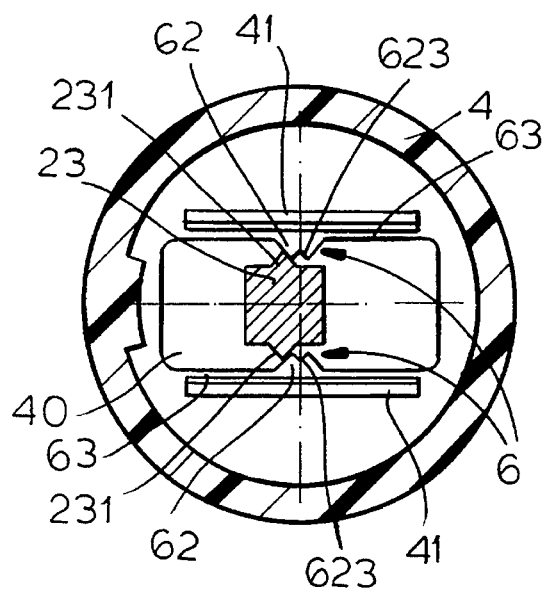
Figure 8:
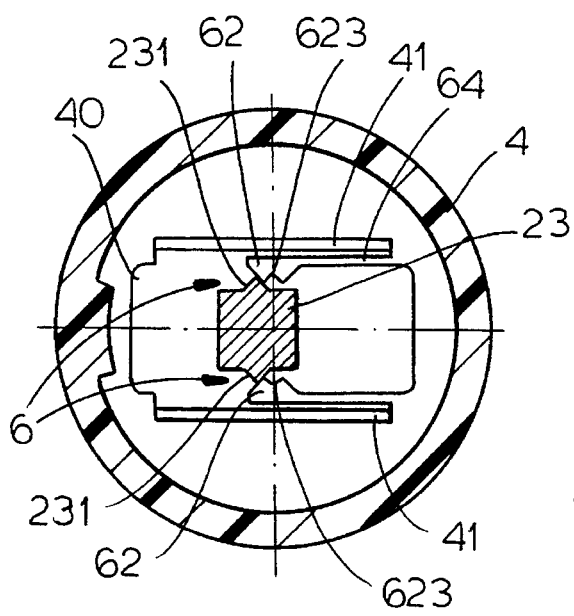

The arrangement of FIG. 6 is identical to that of FIG. 4 except that throughgoing webs 63 are replaced by fingers 64 formed at their outer ends with the bumps 62. In addition the bumps 231 are triangular in section rather than rounded as in FIG. 4. In FIG. 7 the webs 63 are formed with teeth 62 formed with a central notch or recess 623 in which the bumps 231 can seat to define a central stable position for the lever 5. FIG. 8 shows such a system but mounted on fingers 64 rather than throughgoing webs 63.

Figure 9:
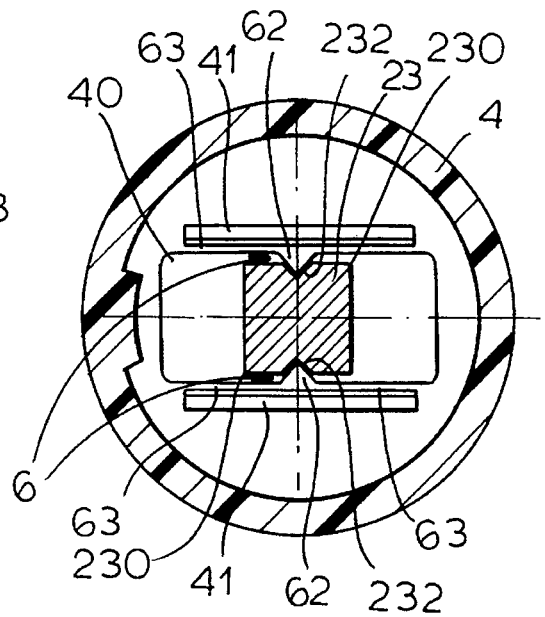
Figure 10:
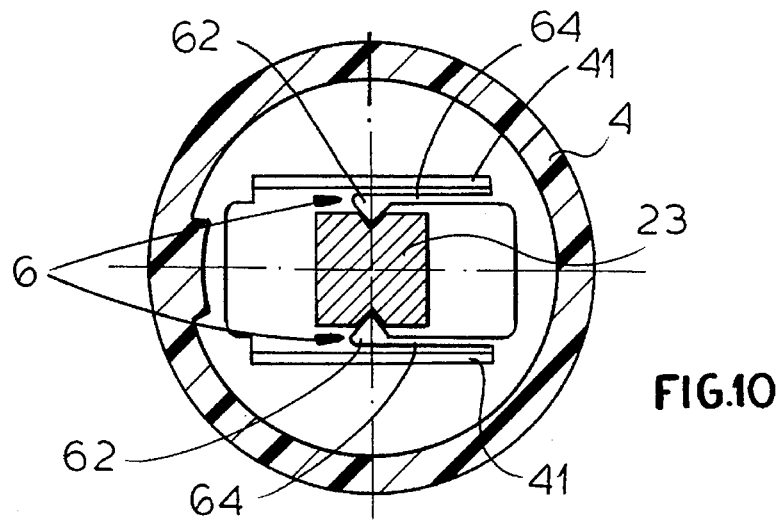

In FIG. 9 the lever 23 is formed on each side face with a groove 232 instead of a bump 231, and the width of the lever 23 is such that the front and rear corners 230 of its side faces engage the stops 62. Thus as, for instance, the lever 5 is pushed back the rear corners 230 will first engage and outwardly deflect the stops 62, providing the user with tactile feedback that a first position has been reached, and when the stops 62 drop into the grooves 232 a second position will clearly be detected. Further movement, at greater force, will move the lever 5 back farther, and when the stops 62 drop off the front corners 230 another position will be detected. FIG. 10 shows a similar system, but with the stops 62 mounted on fingers 64 rather than webs 63.

Figure 11:
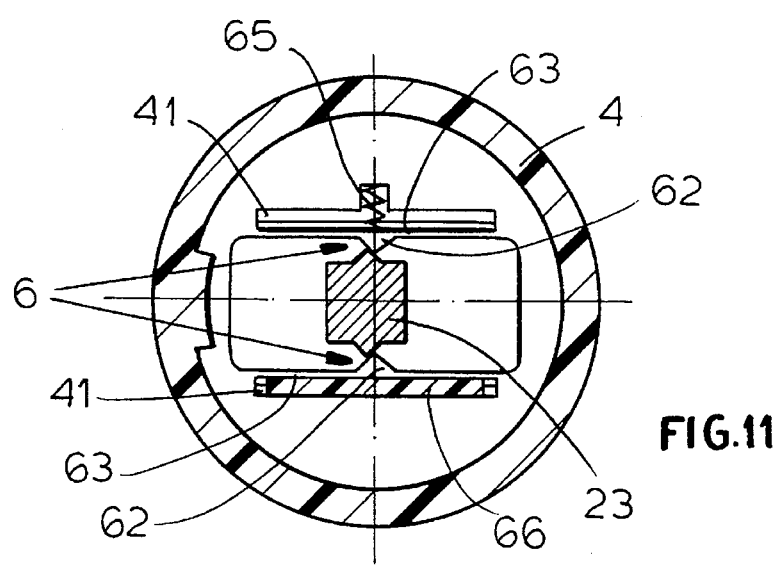
Figure 12:
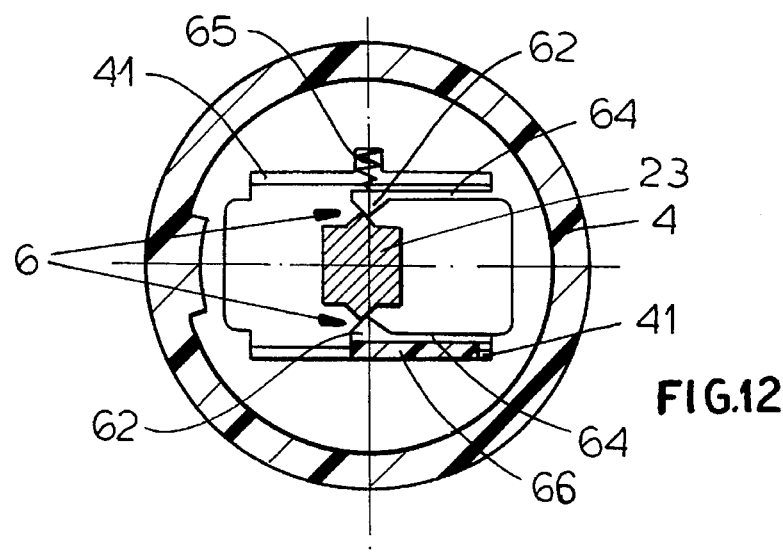
Figure 13:
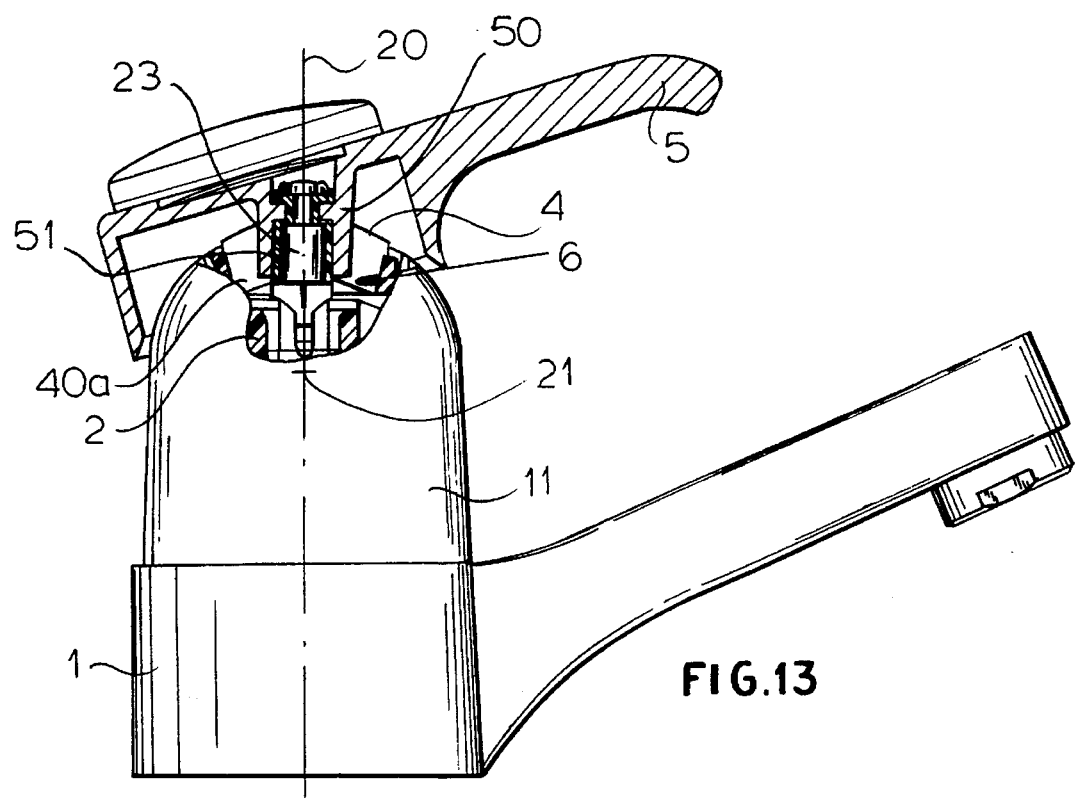
FIG. 13 is a side partly sectional view of another system according to the invention.
Figures 14, 14A:
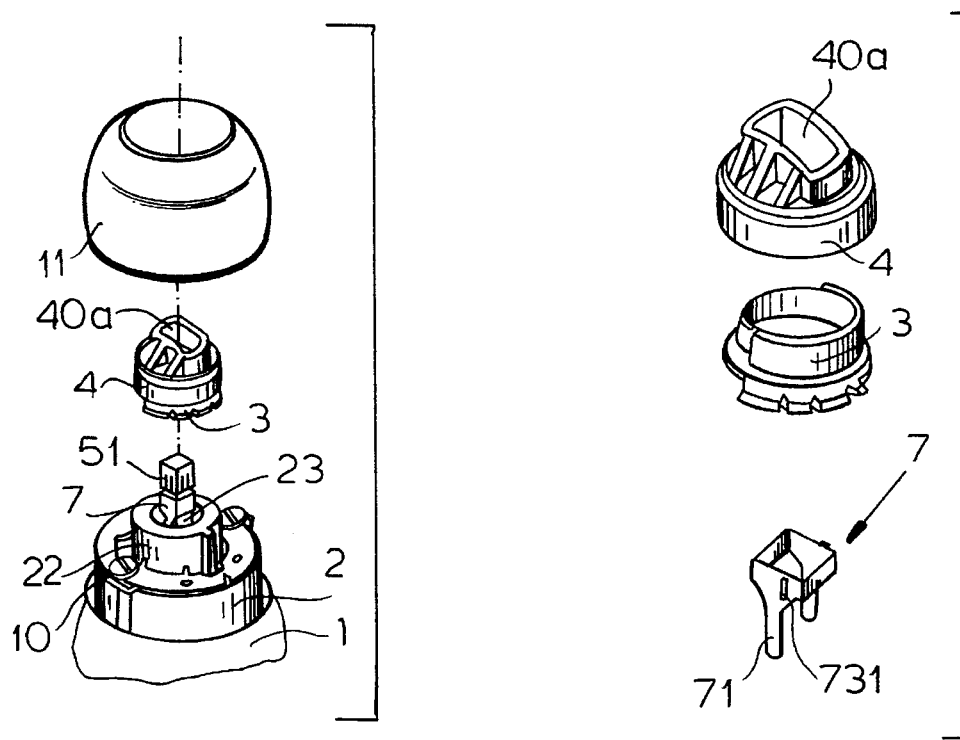
FIG. 14 is a small-scale exploded view of elements of the FIG. 13 valve.
FIG. 14a is another small-scale exploded view of elements of the FIG. 13 valve.
Figure 16:
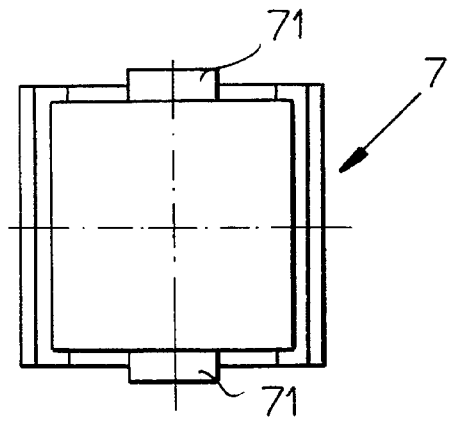
FIGS. 15, 16, 17, and 18 are, respectively, side, bottom, top, and front views of the stop element of FIG. 13.
Figure 18:
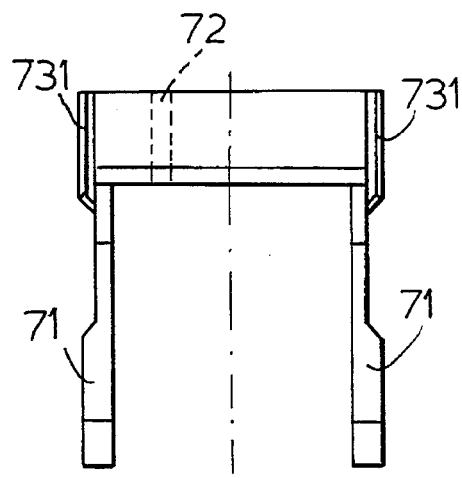
Figure 15:
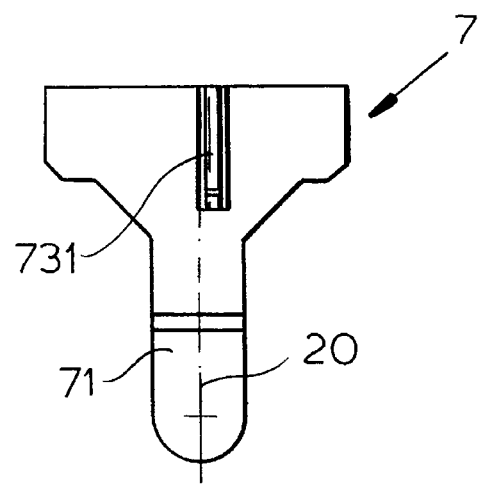
Figure 17:
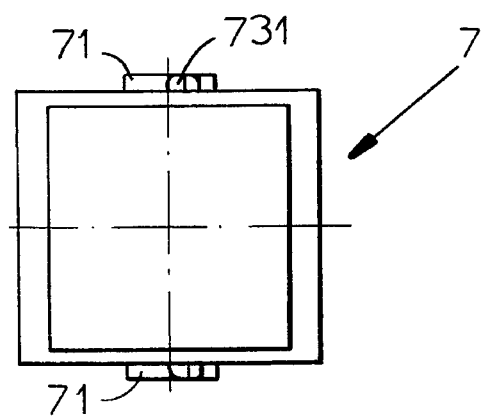

FIG. 11 shows an arrangement identical to that of FIG. 4, but with a spring 65 provided on one side behind the stop 62 and an elastomeric body 66 on the other. These biasing means 65 and 66 increase the stiffness of operation. In FIG.

12 the same system is shown but with fingers 64 rather than webs 63.

The system of FIGS. 13 through 18 uses an insert 7 that forms the stops 6. This insert 7 is tubular and of square section so that it can fit snugly over the square-section lever 23. It has two legs 71 that extend down toward the pivot axis 21 and is formed integrally of plastic with two bumps 731 somewhat offset from the center so that it can be installed in two different positions giving different stop points for the lever 5. The bumps 731 act like the bumps 231 of FIGS. 1 through 4.

With this system the insert 7, which can be split as indicated in dashed lines at 72, can be retrofitted to the faucet and/or removed and/or reversed if necessary. This way the faucet can be changed from one with no central stop to one with such a stop and the position of the stop can be changed.

Figure 19:
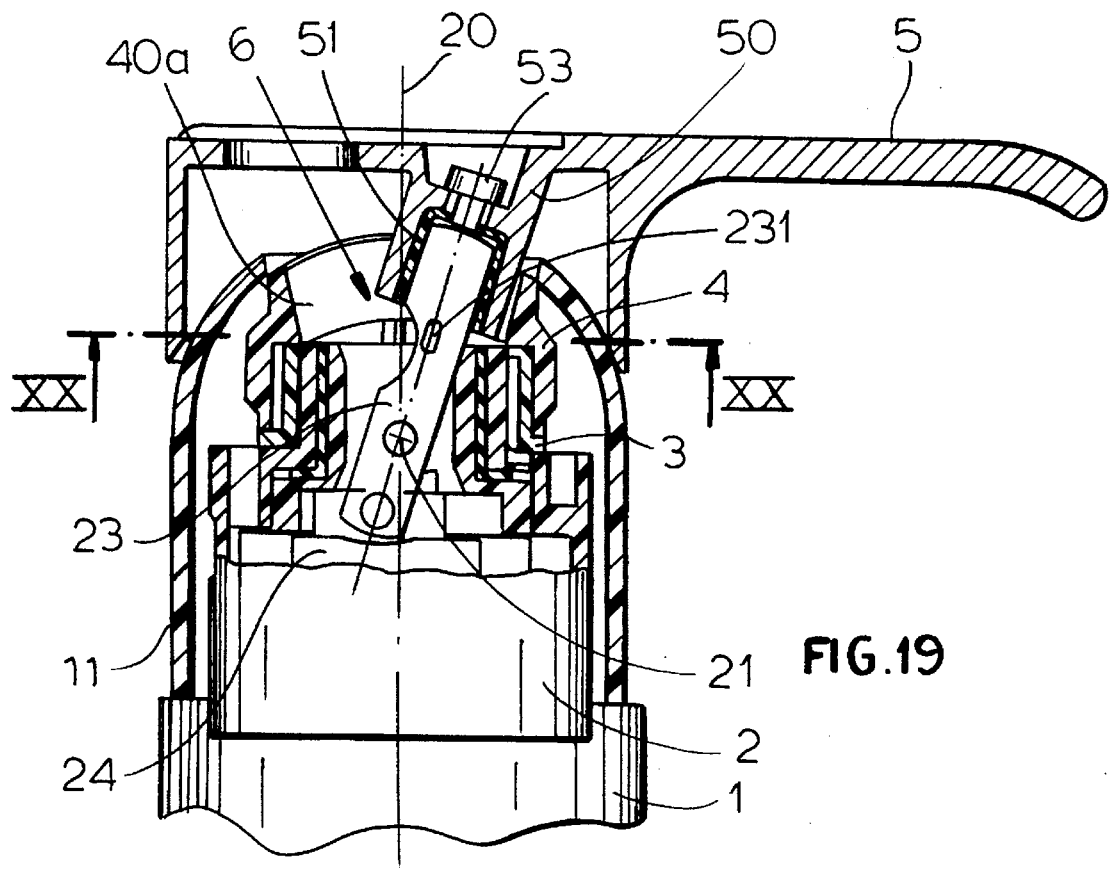
FIG. 19 is a side partly sectional view of a further system according to the invention.
Figure 20:
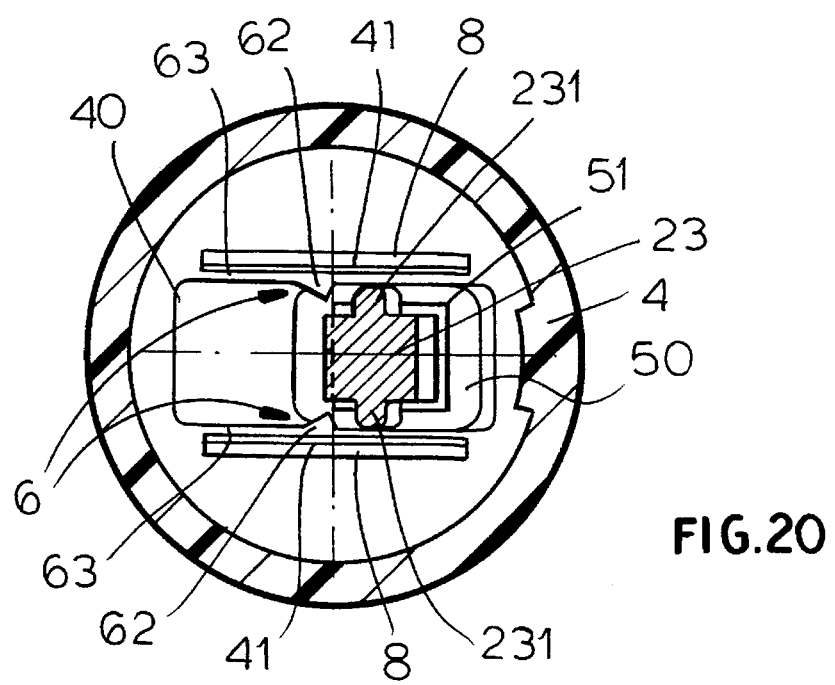
FIG. 20 is a cross section taken along line XX—XX of FIG. 19.

FIGS. 19 and 20 show how in a system identical to that of FIGS. 1 through 4 a filler block 8 can be inserted in the space 41. This block 8 prevents backward deflection of the stops 62, in effect permanently limiting the volume-control stroke of the lever 5, since it cannot move back past the stops 62. The block 8 can be provided with holding barbs to secure it in place in the space 41.

We claim:

1. A flow-control valve comprising:

a housing;

a valve cartridge in the housing connectable between sources of hot and cold water and an output and including valve means for varying volume and temperature of flow from the sources to the output;

a lever pivoted on the cartridge about two transverse axes, connected to the valve means, and movable by pivoting about one of the axes between two opposite end positions along a path in one direction relative to the housing to vary the volume of flow from the sources to the output from maximum flow at one of the end positions to minimum flow at the opposite end position and movable by pivoting about the other of the axes in another direction relative to the housing to vary the temperature of flow from the sources to the output;

a stop on the housing outside the valve cartridge along the path engageable with the lever and laterally deflectable thereby in a position of the lever between its end positions; and spring means urging the stop transversely into the path of the lever and thereby inhibiting movement of the lever along the path past the stop while permitting the lever to deflect and pass the stop on movement between its end positions.

2. The flow-control valve defined in claim 1 wherein the stop is laterally deflectable parallel to the one axis and is unitarily formed with the spring means.

3. The flow-control valve defined in claim 2 wherein the spring means is an elastically deformable part of the housing formed with a bump engageable with the lever and forming the stop.

4. The flow-control valve defined in claim 3 wherein the housing is formed with two such elastically deformable parts and bumps flanking the path and engageable with the lever.

5. The flow-control valve defined in claim 3 wherein the lever is formed with a bump engageable with the stop.

6. The flow-control valve defined in claim 5 wherein the bump of the lever is centrally formed with a notch into which the bump of the stop is engageable.

7. The flow-control valve defined in claim 3 wherein the lever is formed with a notch into which the bump of the stop is engageable.

8. A flow-control valve comprising:

a housing;

a valve cartridge in the housing connectable between sources of hot and cold water and an output and including valve means for varying a volume/rate parameter and a temperature parameter of flow from the sources to the output;

a lever pivoted on the cartridge about two transverse axes, connected to the valve means, and movable by pivoting about one of the axes along a path in one direction relative to the housing to vary one of the parameters and movable by pivoting about the other of the axes in another direction relative to the housing to vary the other parameter;

a stop laterally deflectable on the housing parallel to the one axis outside the valve cartridge along the path engage able with the lever; and spring means unitarily formed with a bump engageable with the lever and forming the stop for urging the stop transversely into the path of the lever and thereby inhibiting movement of the lever along the path past the stop, the bump having a forwardly facing relatively steep flank and a rearwardly facing relatively shallow flank.

9. The flow-control valve defined in claim 3 wherein the housing includes an abutment ring pivotally movable about the other axis with the lever and an abutment ring fixed on the housing and engageable with the movable abutment ring in angular end positions of the lever.

10. The flow-control valve defined in claim 9 wherein the movable abutment ring is formed with a slot defining the path and traversed by the lever and with the housing part forming the bump.

11. The flow-control valve defined in claim 3 wherein the part is a web having both ends unitarily joined with the housing and centrally formed with the bump.

12. The flow-control valve defined in claim 3 wherein the part is a finger having one end joined unitarily with the housing and an opposite free end formed with the bump.

13. The flow-control valve defined in claim 3 wherein the lever is provided with a tubular insert fitting snugly around the lever and formed with a bump engageable with the bump of the stop.

14. A flow-control valve comprising:

a housing;

a valve cartridge in the housing connectable between sources of hot and cold water and an output and including valve means for varying a volume/rate parameter and a temperature parameter of flow from the sources to the output;

a lever pivoted on the cartridge about two transverse axes, connected to the valve means and movable by pivoting about one of the axes along a path in one direction relative to the housing to vary one of the parameters and movable by pivoting about the other of the axes in another direction relative to the housing to vary the other parameter;

a stop laterally deflectable on the housing parallel to the one axis outside the valve cartridge along the path engage able with the lever;

spring means unitarily formed with a bump engageable with the fever and forming the stop for urging the stop transversely into the path of the lever and thereby inhibiting movement of the lever along the path past the stop; and a removable filler block fittable between the bump and the housing for preventing lateral deflection of the bump and movement of the lever past the bump.

15. The flow-control valve defined in claim 3 wherein the spring means is a separate biasing element braced between the part and the housing.

16. The flow-control valve defined in claim 3 wherein the housing includes a removable insert forming the part and bump and fittable in either of two positions in the housing, the bump being positioned to be in two different positions along the path depending on the position of the inert in the housing.

17. The flow-control valve defined in claim 3 wherein the bump and part are unitarily formed of a stiff but elastically deformable plastic.

18. The flow-control valve defined in claim 3 wherein the lever has an upper end provided with a handle.

19. The flow-control valve defined in claim 18, further comprising an insulating sleeve between the lever upper end and the handle.

20. The flow-control valve defined in claim 3 wherein the cartridge has an upstanding collar from which the lever extends and on which the part with the bump is mounted.

* * * * *